United States Patent
Schafiyha et al.

(10) Patent No.: US 6,687,594 B1
(45) Date of Patent: Feb. 3, 2004

(54) TRACTION-SLIP CONTROL METHOD WITH THEORETICAL TRANSVERSAL ACCELERATION AND CONTROL CIRCUIT FOR CARRYING OUT SUCH A TRACTION-SLIP CONTROL METHOD

(75) Inventors: Scharad Schafiyha, Bad Soden (DE); Jörg Steinbrück, Altenstadt-Oberau (DE); Christof Schütz, Flörsheim (DE); Gerhard Fischle, Esslingen (DE); Joachim Jung, Ebersbach (DE); Carola Pfister, Plochingen (DE)

(73) Assignees: Continental Teves, AG & Co. oHG, Frankfurt (DE); Diamler Chrysler AG, Stuttgart (DE)

( * ) Notice: Subject to any disclaimer, the term of this patent is extended or adjusted under 35 U.S.C. 154(b) by 0 days.

(21) Appl. No.: 09/914,809

(22) PCT Filed: Mar. 6, 2000

(86) PCT No.: PCT/EP00/01874

§ 371 (c)(1),
(2), (4) Date: Mar. 28, 2002

(87) PCT Pub. No.: WO00/53447

PCT Pub. Date: Sep. 14, 2000

(30) Foreign Application Priority Data

Mar. 8, 1999 (DE) .......................... 199 10 054

(51) Int. Cl.$^7$ ................................................ G06F 7/00
(52) U.S. Cl. .................... 701/82; 701/72; 180/244
(58) Field of Search ............... 701/82, 84, 87, 701/90, 71, 72, 74; 180/244

(56) References Cited

U.S. PATENT DOCUMENTS

| | | | |
|---|---|---|---|
| 4,998,593 A | 3/1991 | Karnopp et al. | |
| 5,216,608 A | * 6/1993 | Ito et al. | 701/90 |
| 5,269,391 A | * 12/1993 | Ito et al. | 180/197 |
| 5,276,624 A | 1/1994 | Ito et al. | |
| 5,734,595 A | 3/1998 | Matsuno | |
| 6,145,614 A | * 11/2000 | Kimura et al. | 180/248 |
| 6,259,973 B1 | * 7/2001 | Ehret et al. | 701/1 |
| 6,266,599 B1 | * 7/2001 | Van Zanten et al. | 701/71 |
| 6,272,420 B1 | * 8/2001 | Schramm et al. | 701/72 |
| 6,285,933 B1 | * 9/2001 | Kohler et al. | 701/34 |
| 6,366,844 B1 | * 4/2002 | Woywod et al. | 701/83 |
| 6,368,250 B1 | * 4/2002 | Marten et al. | 477/175 |
| 6,427,130 B1 | * 7/2002 | Mergenthaler et al. | 702/142 |
| 6,456,924 B1 | * 9/2002 | Schmitt et al. | 701/82 |
| 6,523,914 B2 | * 2/2003 | Poggenburg et al. | 303/146 |

FOREIGN PATENT DOCUMENTS

| | | |
|---|---|---|
| EP | 439 191 | 7/1991 |
| EP | 694 464 | 1/1996 |

* cited by examiner

*Primary Examiner*—William A. Cuchlinski, Jr.
*Assistant Examiner*—Olga Hernandez

(57) ABSTRACT

The invention relates to a traction slip control method for an automotive vehicle wherein a traction slip control phase for a respective drive wheel is activated by way of a control strategy when the traction slip of said wheel exceeds a predeterminable slip threshold value This method includes a reference transverse acceleration that is recorded for a cornering maneuver to be expected, then an actual transverse acceleration is determined, a difference between the reference transverse acceleration ($a_{y\text{-}ref}$) and the actual transverse acceleration ($a_{y\text{-}ist}$) is calculated, and it is determined whether the amount of the difference exceeds a limit value, and wherein in the case when the amount of the difference exceeds the limit value, the control strategy is modified so that a higher torque can be achieved at least on two wheels than in the case that the amount of the difference does not exceed the limit value. Further, the invention provides a control circuit that implements the above method.

17 Claims, 1 Drawing Sheet

$a_{y\_ref}$ = reference transverse acceleration
$a_{y\_ist}$ = actual transverse acceleration M Soll = adjustable engine torque

TRACTION-SLIP CONTROL METHOD WITH THEORETICAL TRANSVERSAL ACCELERATION AND CONTROL CIRCUIT FOR CARRYING OUT SUCH A TRACTION-SLIP CONTROL METHOD

TECHNICAL FIELD AND BACKGROUND OF THE INVENTION

The present invention relates to a traction slip control method for an automotive vehicle wherein a traction slip control phase for a respective drive wheel is activated by way of a control strategy when the traction slip of said wheel exceeds a predeterminable slip threshold value (Ssw).

Further, the present invention relates to a control circuit for controlling the driving stability of a vehicle wherein defining input quantities are sensed and processed for fixing a course so that a traction slip control operation can be carried out by influencing the transmission of engine torques to individual wheels.

A generic method and a generic device are known from the book of M. Burckhard, 'Fahrwerktechnik; Radschlupf-Regelsysteme', Vogel-Buchverlag, 1993.

During traction slip control operations in sharp curves (hairpin turns), the engine torque is controlled to a low level due to the relief of the curve-inward drive wheel in connection with sensitive slip control thresholds. In the course of further acceleration out of the curve, especially at high coefficients of friction where the wheel slip stabilizes again quickly, due to driving stability, a lack in traction will occur, which traction is possible and desired by the driver.

An object of the present invention is to improve upon a generic method so that an increase in traction is achieved during cornering, especially in an acceleration process that takes place during cornering.

SUMMARY OF THE INVENTION

According to the present invention, this object is achieved in that a generic method is performed so that a reference transverse acceleration is determined for a cornering maneuver to be expected, that an actual transverse acceleration is determined, that a difference between the reference transverse acceleration $a_{y\text{-}ref}$ and the actual transverse acceleration $a_{y\text{-}ist}$ is calculated, and it is determined whether the amount of the difference exceeds a limit value, and wherein in the case that the amount of the difference exceeds the limit value, the control strategy is modified so that a higher torque can be achieved at least on two wheels than in the case that the amount of the difference does not exceed the limit value.

Besides, the present invention arranges for a generic control circuit to be so configured that the control circuit comprises at least one means for determining and/or storing a reference transverse acceleration and a comparator, wherein the comparator compares the reference transverse acceleration $a_{y\text{-}ref}$ with a determined actual transverse acceleration.

Thus, the present invention discloses determining by a comparison between a reference transverse acceleration and an actual transverse acceleration whether a transmission of engine torques to the individual wheels shall be influenced.

An advantageous implementation of the present method, or an expedient embodiment of the device is characterized in that—when the amount of the difference exceeds the limit value—a higher torque is achieved on all driven wheels.

To enhance the reliability it is suitable that the reference transverse acceleration is determined in dependence on the actual transverse acceleration.

Further, it is favorable that the torque is only increased when the reference transverse acceleration ($a_{y\text{-}ref}$) is higher than a threshold value $K_2$.

A particularly suitable embodiment of the method and the device is characterized in that for at least one wheel of the vehicle an engine torque is determined which can maximally be used on this wheel.

It is especially advantageous that for all driven wheels of the vehicle that engine torque is determined which can maximally be used on them.

For a further increase in driving stability, it is suitable that the maximally utilizable engine torque is determined by a slip requirement of at least one inward wheel.

A favorable implementation of the present method or embodiment of the device, respectively, is characterized in that an increase of the torque achieved on the wheels is carried out only when slip signals do not exceed a defined threshold value.

Further advantages, special features and preferred aspects of the present invention can be gathered from the subclaims and the following description of preferred embodiments making reference to the accompanying drawings.

DETAILED DESCRIPTION OF THE PREFERRED EMBODIMENT

Figure 1:
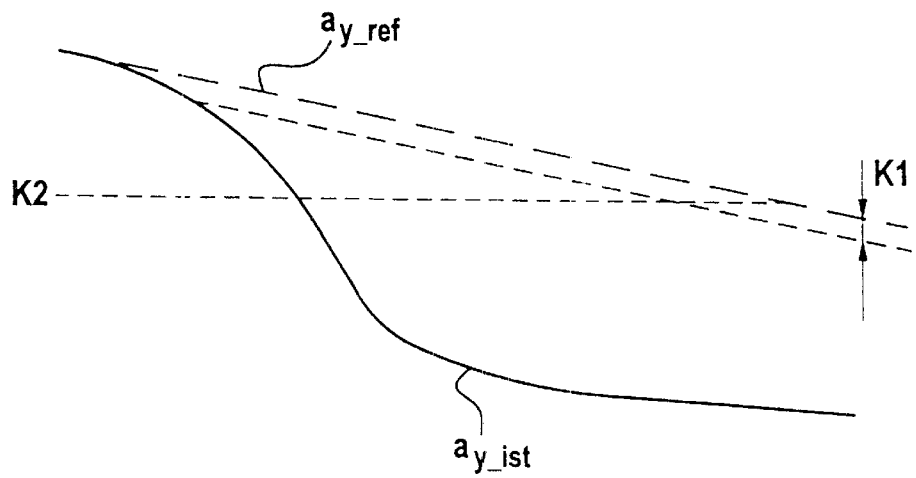
FIG. 1 is an illustration of a reference transverse acceleration $a_{y\text{-}ref}$ that represents a drag pointer, as a function of the driving time during a cornering maneuver.

The following description of the preferred embodiment of the invention is not intended to limit the scope of the invention that is described, but rather to enable a person skilled in the art to make and use the invention.

It will be explained in the following by way of the illustrations how the present invention permits detecting driving situations where there is the risk of too low traction and where the traction is increased by a defined intervention.

The detection of the driving situation is based on a quick decrease of transverse acceleration. To this end, a drag pointer ($a_{y\text{-}ref}$) is formed from the actual, decreasing transverse acceleration ($a_{y\text{-}ist}$). This reference quantity shall represent a transverse acceleration decrease which corresponds to a 'normal' cornering maneuver and follows the actual transverse acceleration with a defined step size.

Outward steering is detected when the positive difference between the reference acceleration and the actual transverse acceleration exceeds a determined band, especially when $$((a_{y\text{-}ref} - a_{y\text{-}ist})) > K1$$

applies. Thus, outward and inward steering by the driver does not lead to an erroneous detection and unjustified effect.

When entering into a curve, the drag pointer $a_{y\text{-}ref}$ is increased as well as the actual transverse acceleration $a_{y\text{-}ist}$. The transverse acceleration is maximal in the vertex of the curve. It decreases subsequently. The actual transverse acceleration decreases very quickly in an outward steering situation. This renders the difference between the reference acceleration and the actual transverse acceleration very great. The magnitude of this difference is an indicator of the existence of an outward steering situation.

Besides, it is found out whether a stable outward steering situation exists. This is preferably determined by a test of the running behavior of a curve-inward wheel. Usually, a curve-outward wheel would have to be taken into consideration for the stability of the driving situation in a cornering maneuver. When exiting from the curve, however, taking the curve-inward wheel into account is more favorable because it can hereby be indicated by way of signals that the vehicle, on principle, is heading straight so that a tendency to roll is scarcely imminent.

As soon as the curve-inward wheel which is most susceptible to the tendency to roll is stable again, a full torque transmission can be carried out again and, therefore, a full torque can be transmitted to all of the driven wheels.

Further, it is expedient that these corrections act only in sharp curves with a high transverse acceleration because the wheel is relieved in these cases which leads to a control with a high engine torque reduction. Therefore, the reference transverse acceleration must lie above a defined threshold for the detection, that means, the following equation should apply:

$$(a_{y\text{-}ref}) > K2.$$

The stability of the vehicle and the engine torque maximally achievable on the wheel is determined by the slip requirement of the curve-inward wheel. The filtered slip which is determined from the wheel signals must not exceed a defined threshold value while the measure is to take effect.

When a stable outward steering situation was detected during a traction torque control, the gradient of the engine torque increase can be raised as a function of the difference $$(a_{y\text{-}ref} - a_{y\text{-}ist}).$$

Before detection of the outward steering situation, the torque is gradually decreased and subsequently gradually increased in the case illustrated in FIG. 2. In the traction slip control method of the present invention, a continuous variation of the torque is also possible, instead of a gradual variation. The steps illustrated are induced by circuit technology because gradual variations can be achieved in a more stable fashion in a control circuit equipped with proportional integral differential (PID) controllers.

Figure 2:
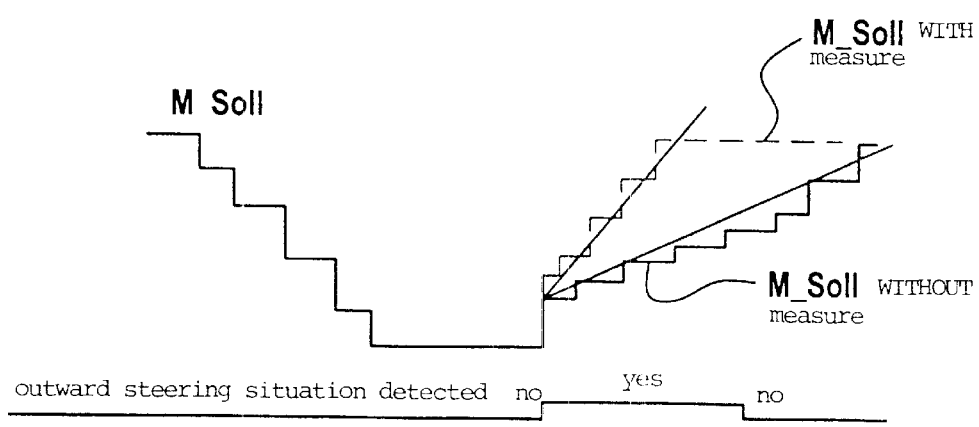
FIG. 2 is an illustration showing values for a torque that can maximally be used on a driven wheel as a function of the driving time during the cornering maneuver.

FIG. 2 shows that the variation of the control strategy of the traction slip control method additionally contributes to a raise in the engine torque increase that is already provided.

The method described hereinabove is implemented in an electronic stability program such as the MK20E-1-ESP-Code for the Daimler Chrysler BR203 vehicle. High traction along with a very good driving stability has shown in driving tests.

The determination is effected with an appropriate measuring arrangement which is also referred to as sensor system. The sensor system concerns in particular component parts of a driving dynamics control system already installed in the vehicle, such as the so-called ESP system.

The foregoing discussion discloses and describes preferred embodiments of the invention. One skilled in the art will readily recognize from such discussion, and from the accompanying drawings and claims, that changes and modifications can be made to the invention without departing from the true spirit and fair scope of the invention as defined in the claims.

We claim:

1. A traction slip control method for an automotive vehicle wherein a traction slip control phase for a respective drive wheel is activated by way of a control strategy when the traction slip of said wheel exceeds a predeterminable slip threshold value comprising the steps of:

determining a reference transverse acceleration for a cornering maneuver to be expected;

determining an actual transverse acceleration;

calculating a difference between the reference transverse acceleration ($a_{y\text{-}ref}$) and the actual transverse acceleration ($a_{y\text{-}ist}$); and determining whether the amount of the difference exceeds a limit value, and wherein in the case that the amount of the difference exceeds the limit value, modifying the control strategy so that a higher torque can be achieved at least on two wheels than in the case that the amount of the difference does not exceed the limit value.

2. A traction slip control method as claimed in claim 1, wherein when the amount of the difference exceeds the limit value, a higher torque is achieved on all driven wheels.

3. A traction slip control method as claimed in claim 1 wherein the transverse acceleration is determined in dependence on the actual transverse acceleration.

4. A traction slip control method as claimed in claim 1 wherein the torque is only increased when the reference transverse acceleration ($a_{y\text{-}ref}$) is higher than a threshold value ($K_2$).

5. A traction slip control method as claimed in claim 1 wherein for at least one wheel of the vehicle, an engine torque is determined which can maximally be used on the said wheel.

6. A traction slip control method as claimed in claim 5 wherein for all driven wheels of the vehicle, each time that engine torque is determined that can maximally be used on them.

7. A traction slip control method as claimed in claim 5 wherein the maximally utilizable engine torque is determined by a slip requirement of at least one inward wheel.

8. A traction slip control method as claimed in claim 1 wherein an increase of the torque achieved on the wheels is carried out only when slip signals do not exceed a defined threshold value.

9. A control circuit for controlling the driving stability of a vehicle, wherein defining input quantities for fixing a course are sensed and processed so that traction slip control can be performed by influencing a transmission of engine torques to individual wheels, comprising:

a control circuit having a means for determining and/or storing a reference transverse acceleration for a cornering maneuver to be expected and a comparator;

wherein the comparator compares the reference transverse acceleration ($a_{y\text{-}ref}$) with a determined actual transverse acceleration, and it is determined whether the amount of the difference exceeds a limit value; and wherein in the case that the amount of the difference exceeds the limit value, the slip control is modified so that a higher torque can be achieved at least on two wheels than in the case that the amount of the difference does not exceed the limit value.

10. A control circuit as claimed in claim 9, wherein the comparator determines a difference between the reference transverse acceleration ($a_{y\text{-}ref}$) and the actual transverse acceleration ($a_{y\text{-}ist}$).

11. A traction slip control method for an automotive vehicle wherein a traction slip control phase for a respective drive wheel is activated by way of a control strategy when the traction slip of said wheel exceeds a predeterminable slip threshold value comprising the steps of:

determining a reference transverse acceleration for a cornering maneuver to be expected;

determining an actual transverse acceleration;

calculating a difference between the reference transverse acceleration ($a_{y\text{-}ref}$) and the actual transverse acceleration ($a_{y\text{-}ist}$); and determining whether the amount of the difference exceeds a limit value, and wherein in the case that the amount of the difference exceeds the limit value, modifying the control strategy so that a higher torque can be achieved on all driven wheels than in the case that the amount of the difference does not exceed the limit value.

12. A traction slip control method as claimed in claim 11 wherein the transverse acceleration is determined in dependence on the actual transverse acceleration.

13. A traction slip control method as claimed in claim 11 wherein the torque is only increased when the reference transverse acceleration ($a_{y\text{-}ref}$) is higher than a threshold value ($K_2$).

14. A traction slip control method as claimed in claim 11 wherein for at least one wheel of the vehicle, an engine torque is determined which can maximally be used on the said wheel.

15. A traction slip control method as claimed in claim 14 wherein for all driven wheels of the vehicle, each time that engine torque is determined that can maxim ally be used on them.

16. A traction slip control method as claimed in claim 14 wherein the maximally utilizable engine torque is determined by a slip requirement of at least one inward wheel.

17. A traction slip control method as claimed in claim 11 wherein an increase of the torque achieved on the wheels is carried out only when slip signals do not exceed a defined threshold value.

* * * * *

UNITED STATES PATENT AND TRADEMARK OFFICE
CERTIFICATE OF CORRECTION

PATENT NO. : 6,687,594 B1
DATED : February 3, 2004
INVENTOR(S) : Scharad Schafiyha et al.

It is certified that error appears in the above-identified patent and that said Letters Patent is hereby corrected as shown below:

<u>Title page,</u>
Item [30], Foreign Application Priority Data, delete "199 10 054" and substitute -- 199 10 054.3 -- in its place.

<u>Column 6,</u>
Line 7, delete "maxim ally" and substitute -- maximally -- in its place.

Signed and Sealed this

Twenty-seventh Day of April, 2004

JON W. DUDAS
*Acting Director of the United States Patent and Trademark Office*